(12) United States Patent
Kobayashi et al.

(10) Patent No.: US 6,601,980 B2
(45) Date of Patent: Aug. 5, 2003

(54) INFRARED-RAY RADIATING LAMP FOR AUTOMOBILE

(75) Inventors: Shoji Kobayashi, Shizuoka (JP); Atsushi Sugimoto, Shizuoka (JP); Takashi Inoue, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/783,028

(22) Filed: Feb. 15, 2001

(65) Prior Publication Data
US 2001/0019482 A1 Sep. 6, 2001

(30) Foreign Application Priority Data
Feb. 15, 2000 (JP) ...................................... P.2000-036885

(51) Int. Cl.$^7$ ................................................. F21V 11/00
(52) U.S. Cl. ..................... 362/510; 362/293; 362/231; 362/255; 362/256; 362/543; 362/545
(58) Field of Search ................................. 362/510, 293, 362/231, 255, 256, 543, 545, 464, 551–554, 294, 249, 276; 315/159; 340/479

(56) References Cited

U.S. PATENT DOCUMENTS

| | | | | |
|---|---|---|---|---|
| 4,958,263 A | * | 9/1990 | Davenport et al. | ......... 362/255 |
| 5,243,501 A | * | 9/1993 | Makita et al. | ............... 362/293 |
| 5,488,546 A | | 1/1996 | Sato et al. | ..................... 362/61 |
| 5,660,462 A | * | 8/1997 | Bockley et al. | ............. 313/113 |
| 5,700,084 A | * | 12/1997 | Yasukawa et al. | ...... 356/139.05 |
| 5,967,647 A | * | 10/1999 | Eichler | ....................... 362/299 |

* cited by examiner

Primary Examiner—Sandra O'Shea
Assistant Examiner—Mark Tsidulko
(74) Attorney, Agent, or Firm—Sughrue Mion, PLLC

(57) ABSTRACT

An infrared-ray radiating lamp which is prevented from being mistaken for a tail lamp or a stop lamp by ensuring that not only infrared rays but also visible rays are emanated from a front lens simultaneously. The lamp includes a lighting chamber defined by a lamp body and a front lens, a reflector disposed in the lighting chamber, and infrared-ray radiation means and visible-ray radiation means disposed in front of the reflector in the lighting chamber. The infrared rays radiated from the infrared-ray radiation means and the visible rays radiated from the visible-ray radiation means are emanated from the front lens simultaneously when the lamp is lit. Thus, the rays distributed by the lamp include both red infrared rays and white visible rays, and therefore a red color is not particularly noticeable. Thus, the infrared-ray radiating lamp when lit is not mistaken for a tail lamp or a stop lamp.

19 Claims, 9 Drawing Sheets

Schematic view of image of the scene while traveling

Example of picture output signal

INFRARED-RAY RADIATING LAMP FOR AUTOMOBILE

BACKGROUND OF THE INVENTION

The present invention relates to an infrared-ray radiating lamp intended for installation on an automobile which radiates infrared rays onto a region in front of the automobile and, more particularly, to such an infrared-ray radiating lamp which is used in combination with a CCD camera having a sensitivity covering the near-infrared range to provide the driver of the vehicle in which the system is mounted a nighttime view of regions including areas beyond those illuminated by the headlamps of the vehicle.

A conventional lamp of this type has an infrared-ray transmitting globe having a surface coated with an infrared-ray transmitting multilayer film disposed so as to cover an infrared/visible-ray source in a lighting chamber defined by a lamp body and a front lens. Infrared rays emitted by the source and transmitted through the globe are reflected by a reflector, transmitted by the front lens and distributed forwards. A CCD camera, which is disposed in a front portion of a vehicle and has sensitivity covering the near-infrared range, images an infrared-ray radiating region in front of the vehicle. The image of this region is processed by an image processor and displayed on a monitor screen in the passenger compartment to thus provide the driver with a view of the scene ahead. The driver can recognize on the monitor screen the presence of objects such as persons, lane-markers and obstacles in the far distance.

However, there is a problem with the aforementioned conventional infrared-ray radiating lamp in that since the infrared-ray transmitting multilayer film cannot completely cut visible rays having relatively long wavelengths in the range of 700 to 800 nm, the lamp appears illuminated in red. This creates the possibility of mistaking the infrared-ray radiating lamp disposed at the front of the vehicle for a tail lamp or a stop lamp, thus causing a safety problem.

SUMMARY OF THE INVENTION

The invention has been made in consideration of the above-mentioned problem of the conventional art. It is, therefore, an object of the invention to provide an infrared-ray radiating lamp that cannot be mistaken for a tail lamp or a stop lamp by ensuring that not only infrared rays but also visible rays are emanated from a front lens simultaneously.

To achieve the aforementioned object, an infrared-ray radiating lamp for an automobile according the invention comprises a lighting chamber defined by a lamp body and a front lens, a reflector disposed in the lighting chamber, and infrared-ray radiation means and visible-ray radiation means disposed in front of the reflector in the lighting chamber, and is constructed so that infrared rays radiated from the infrared-ray radiation means and visible rays radiated from the visible-ray radiation means are emanated from the front lens simultaneously.

When the lamp is illuminated, the infrared rays radiated from the infrared ray radiation means and the visible rays radiated from the visible ray radiation means are reflected by the reflector and emanated from the front lens simultaneously. Thus, the rays radiated by the lamp include both infrared rays and white visible rays. Therefore, the red color is unnoticeable in comparison with the conventional lamp, which mainly radiates infrared rays and appears illuminated in red.

The infrared-ray radiating lamp may be provided with radiation control means for controlling the radiation and the stopping of radiation of infrared rays by at least the infrared-ray radiation means, wherein the radiation control means stops the radiation of infrared rays when the vehicle speed is equal to or lower than a predetermined speed.

Human eyes can be damaged by continuous exposure to infrared rays, which is certainly an undesirable situation. To prevent such damage, if the vehicle speed is so low that the eyes of pedestrians, etc., within the radiation zone of the lamp might be continuously exposed to the infrared rays from the infrared-ray radiating lamp, the radiation control means stops at least the radiation of infrared rays by the infrared-ray radiation means as soon as it is judged, based on speed information obtained from the output of the vehicle speed sensor, that the vehicle speed has become equal to or lower than the predetermined speed.

The infrared-ray radiation means is preferably composed of an infrared/visible-ray source, namely, a source which emits both infrared and visible rays, and an infrared-ray transmitting film partially covering the infrared/visible-ray source, while the visible-ray radiation means is composed of a visible-ray transmitting portion of the infrared/visible-ray source where there is no infrared-ray transmitting film.

The infrared rays from the infrared/visible-ray source are transmitted by the infrared-ray transmitting film, reflected by the reflector, and emanated from the front lens. Simultaneously, the visible rays from the infrared/visible-ray source are transmitted by the visible-ray transmitting portion, reflected by the reflector and emanated from the front lens. As a result, the rays distributed by the lamp include both infrared rays and white visible rays, and therefore the red color is not particularly noticeable.

The infrared-ray transmitting film may be disposed on the outer surface of a glass bulb forming the infrared/visible-ray source. The infrared-ray radiating lamp can be constructed by employing as a light source an infrared/visible-ray radiating bulb having the infrared-ray transmitting film disposed on the outer surface of the glass bulb. The infrared-ray radiating lamp can also be constructed by providing a globe having an infrared-ray transmitting film on its outer surface which covers the bulb forming the infrared/visible-ray source.

The infrared-ray radiating lamp may be constructed so that the globe is longitudinally displaceable between a rearward position on the optical path of rays traveling from the infrared/visible-ray source towards the reflector and a forward position in front of the infrared/visible-ray source. In such a case, when the globe is in the rearward position, the infrared rays from the infrared/visible-ray source are transmitted by the infrared-ray transmitting film of the globe, reflected by the reflector, and distributed forwards, and the visible rays from the infrared/visible-ray source are transmitted by the visible-ray transmitting portion, namely, the region of the globe where there is no infrared-ray transmitting film, reflected by the reflector and distributed forwards. As a result, the rays distributed by the lamp include both infrared rays and visible rays, and therefore the red color is not particularly noticeable. When the globe assumes the forward position, the rays emitted from the infrared/visible-ray source are directly reflected by the reflector and distributed forwards. As a result, the rays distributed by the lamp mainly include visible rays.

Further, the infrared-ray radiation means may be composed of an infrared/visible-ray source and an infrared-ray transmitting film covering the infrared/visible-ray source, and that the visible-ray radiation means may be constructed of an auxiliary bulb disposed in front of the reflector in the lighting chamber. In this case, the infrared rays from the infrared/visible-ray source are transmitted by the infrared-ray transmitting film, reflected by the reflector and emanated from the front lens. Simultaneously, the rays (visible rays) emitted from the auxiliary bulb are reflected by the reflector and emanated from the front lens. As a result, the rays distributed by the lamp include both red infrared rays and white visible rays, and therefore the red color is not particularly noticeable.

The reflector may be composed of an elliptical mirror at the center and a parabolic mirror disposed outside the elliptical mirror. The infrared-ray radiation means may be composed of the elliptical mirror, with the infrared/visible-ray source disposed in the proximity of a first focus of the elliptical mirror, a projection lens disposed in front of the infrared/visible-ray source, and an infrared-ray transmitting filter disposed between the infrared/visible-ray source and the projection lens. The visible-ray radiation means is composed of the infrared/visible-ray source and the parabolic mirror.

With this construction, the infrared rays from the infrared/visible-ray source, which have been reflected by the elliptical mirror so as to converge at the second focus, are transmitted by the infrared-ray transmitting filter prior to reaching the projection lens, projected and distributed forwards by the projection lens, and thus emanated from the front lens. On the other hand, the visible rays emitted by the infrared/visible-ray source, which have been reflected by the parabolic mirror, are also emanated from the front lens simultaneously with the infrared rays. As a result, the rays emitted by the lamp include both infrared rays and white visible rays, and therefore the red color is not particularly noticeable.

DESCRIPTION OF THE PREFERRED EMBODIMENTS

Preferred embodiments for implementing the invention will now be described.

Figure 1:
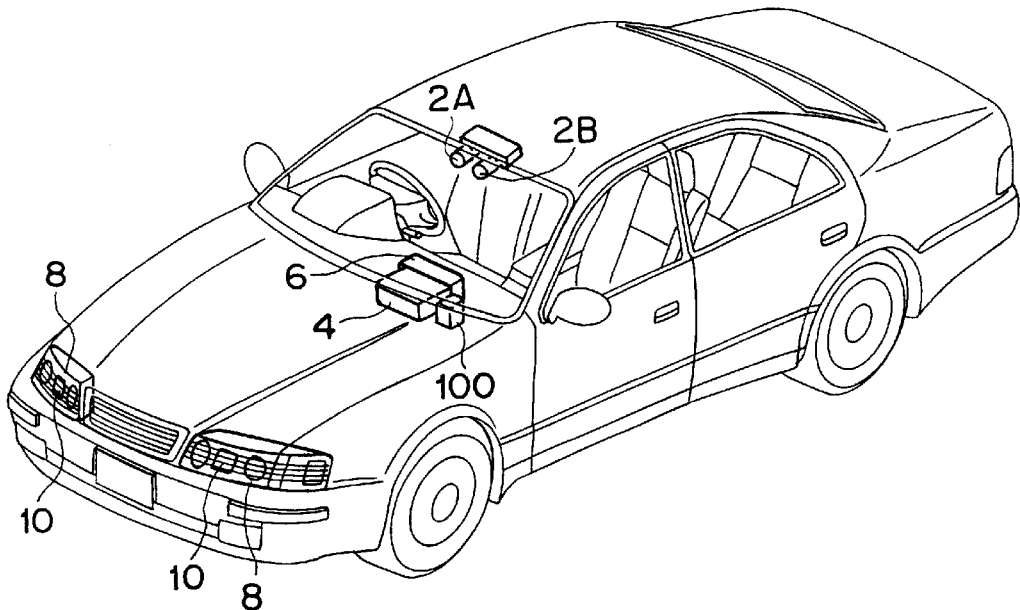
FIG. 1 shows the overall structure of a nighttime front visual range detecting system according to a first embodiment of the invention.
Figure 2A:
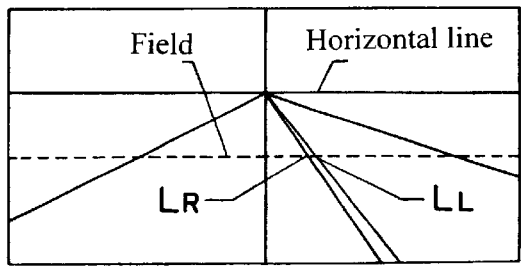
FIG. 2A is a schematic view of an image in front of a vehicle.
Figure 2B:
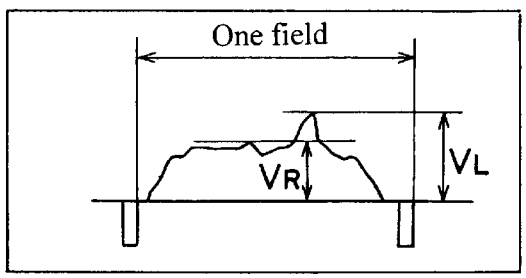
FIG. 2B shows a picture output signal produced by an image processing analyzer.
Figure 3:
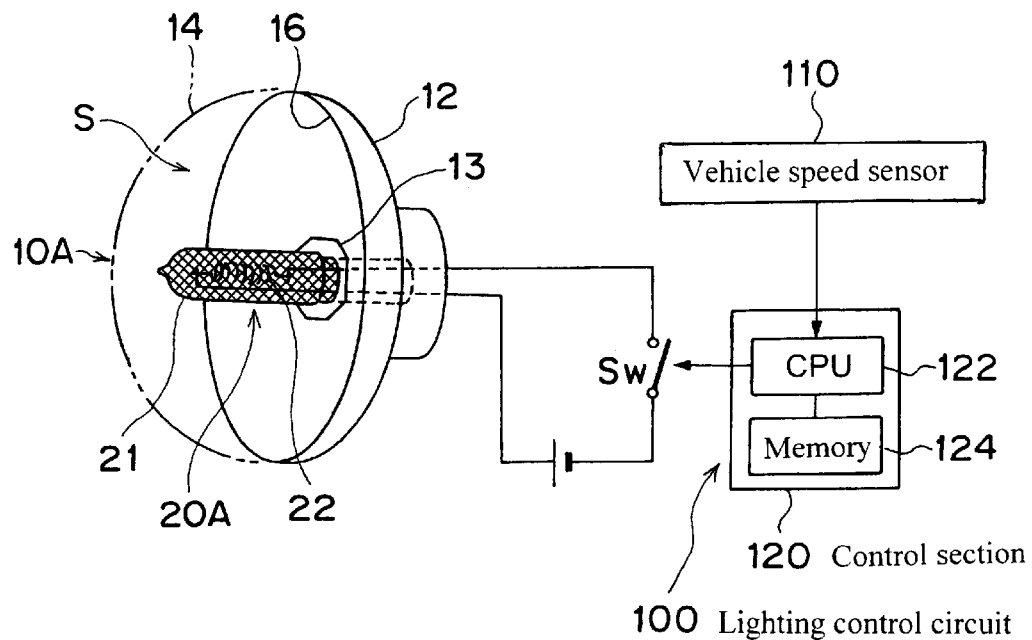
FIG. 3 is a perspective view of an infrared-ray radiating lamp.
Figure 4:
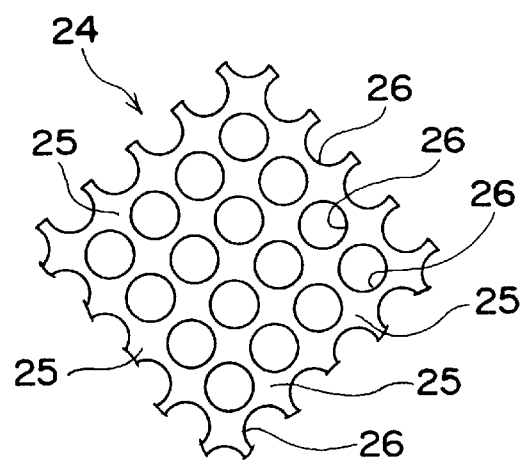
FIG. 4 is a partially enlarged expanded view of an infrared-ray transmitting multilayer film disposed in an infrared/visible-ray radiating bulb acting as a light source of an infrared-ray radiating lamp.
Figure 5:
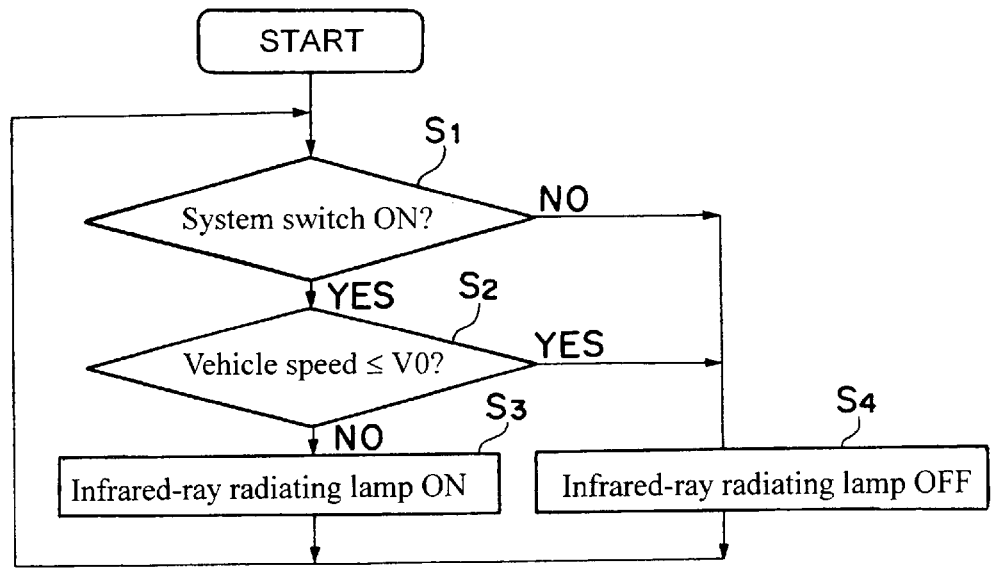
FIG. 5 is a flowchart showing processing operations carried out by a CPU in a control section for controlling the lighting of an infrared-ray radiating lamp.

FIGS. 1 through 5 show a nighttime front visual range detecting system constructed according to a first preferred embodiment of the invention. FIG. 1 shows the overall structure of a nighttime front visual range detecting system. FIG. 2A is a schematic view of an image in front of a vehicle. FIG. 2B shows an image output signal which indicates an image in front of a vehicle and which has been produced by an image processing analyzer. FIG. 3 is a perspective view of an infrared-ray radiating lamp. FIG. 4 is a partially enlarged expanded view of an infrared-ray transmitting multilayer film disposed on an infrared/visible-ray radiating bulb acting as a light source of an infrared-ray radiating lamp. FIG. 5 is a flowchart showing processing operations carried out by a CPU in a control section for controlling the lighting of an infrared-ray radiating lamp.

As shown in FIG. 1, the nighttime front visual range detecting system of this embodiment includes as primary components a headlamp 8 and an infrared-ray radiating lamp 10A that are disposed at a front portion of a vehicle, a pair of CCD cameras 2A, 2B for imaging a predetermined visual range in front of the vehicle, an image processing analyzer 4 for analyzing images sensed by the CCD cameras 2A, 2B, and a head-up display (HUD) 6 for displaying data analyzed by the image processing analyzer 4.

The CCD cameras for imaging the range in front of the vehicle are composed of a visible-ray CCD camera 2A having sensitivity in a visible-ray range and a infrared-ray CCD camera 2B having sensitivity covering an infrared-ray range. These cameras are of a stereo camera type and are capable of measuring the distance to an imaged object in front of the vehicle. Images imaged by the CCD cameras 2A, 2B are transmitted to the image processing analyzer 4 where the two pictures are compared with each other.

That is, image output voltages of respective scanning lines (fields) are derived from a picture (image) as shown in FIG. 2A which has been imaged by the CCD cameras. These voltages are stored as data representing an entire screen (or a main portion) after being subject to γ correction (correction of photoelectric conversion characteristics) for the cameras 2A, 2B. This γ correction is required for the purpose of combining the sensitivities of the cameras 2A, 2B and obtaining substantially the same picture output from the cameras 2A, 2B for an object on the road. If differences between the two images are extracted and those of the differences which are greater than a certain threshold are extracted from the image, an image of pedestrians, obstacles, lane-marks and the like within the range of the lamp is obtained. By subjecting the differential image to edge processing or pattern recognition, it becomes possible to easily recognize pedestrians, obstacles, lane-markers and the like.

An image of pedestrians, obstacles, lane-marks and the like is displayed to the driver by the head-up display (HUD) 6. Alternatively, the characteristics of objects on the road (pedestrians, obstacles, lane-marks and the like) can be detected by means of shape recognition processing and an audible warning signal issued when appropriate.

As shown in FIG. 3, the infrared-ray radiating lamp 10A is composed of a container-like lamp body 12, a front lens 14, a parabolic reflector 16, and an infrared/visible-ray radiating bulb 20A. The front lens 14 is mounted over a front opening in the lamp body 12 and cooperates with the lamp body 12 to define a lighting chamber S. The reflector 16 is integrally formed on the inner peripheral face of the lamp body 12. The infrared/visible-ray radiating bulb 20A is fitted into a bulb fitting hole 13 formed in a rear top portion of the lamp body 12.

The infrared/visible-ray radiating bulb 20A has a construction wherein an infrared-ray transmitting multilayer film 24 (see FIG. 4) having visible-ray transmitting portions 26 formed as circular holes evenly distributed according to a dot pattern is disposed over the entire outer peripheral face of a glass bulb 21 in which a filament 22 is provided as the light source. Of the rays emitted by the filament 22, infrared rays are transmitted by infrared-ray transmitting portions 25 where the infrared-ray transmitting multilayer film 24 extends, and visible rays are transmitted by the visible-ray transmitting portions 26 designed as circular holes where the infrared-ray transmitting multilayer film 24 is not present. Thus, not only infrared rays but also visible rays are radiated from the infrared/visible-ray radiating bulb 20A simultaneously. In other words, the filament 22 and the infrared-ray transmitting multilayer film 24 (the infrared-ray transmitting portions 25) constitute infrared-ray radiation means, and the filament 22 and the visible-ray transmitting portions 26 where the infrared-ray transmitting multilayer film 24 is not present constitute visible-ray radiation means.

Of the rays emitted by the filament 22, the infrared rays that have been transmitted by the infrared-ray transmitting portions 25 are reflected by the reflector 16, emanated from the front lens 14, and distributed in a predetermined forward direction. The visible rays that have been transmitted by the visible-ray transmitting portions 26 are also reflected by the reflector 16, emanated from the front lens 14, and distributed in a predetermined forward direction. Thus, the rays radiated forwards by the infrared-ray radiating lamp 10A include both infrared rays and visible rays, and therefore the red color is not particularly noticeable.

The ratio (surface ratio) between the infrared-ray transmitting portions 25 and the visible-ray transmitting portions 26 is set to such a ratio that the infrared rays from the lamp 20 (the rays emanated from the front lens 14) can be used for image analysis by the image processing analyzer 4 while the visible rays dull the red color accompanying the infrared rays and make it unnoticeable.

Human eyes may be damaged if they are exposed to infrared rays for a long time. Therefore, as long as the vehicle is moving, thus preventing eye damage by infrared rays, the lamp 10A is lit by a lighting control circuit 100 provided with a vehicle speed sensor 110 and a control section 120 having a CPU 122, a memory unit 124 and the like. When the vehicle speed V is equal to or lower than a predetermined speed V0 that is close to 0, as occurs, for example, when the vehicle is stopped, the lamp 10A is automatically extinguished to prevent eye damage.

That is, a vehicle speed condition for outputting a stop signal for stopping the emission of rays from the bulb 20A is inputted and set in advance in the memory unit 124 of the control section 120. If it is judged from the output from the vehicle speed sensor 110 that the vehicle speed V has become equal to or lower than the predetermined speed V0 that is close to 0, the CPU 122 outputs a stop signal for turning a bulb lighting switch Sw off. Thereby the bulb lighting switch Sw is turned off, and as a result the supply of electric current to the bulb 20A is stopped and the bulb 20A (the lamp 10A) is extinguished.

FIG. 5 is a flowchart showing processing operations of the control section 120 (the CPU 122) in the lighting control circuit 100. This routine is started on the premise that the headlamp 8 is lit (to emit a low beam or a high beam).

First, it is judged in Step S1 whether or not a switch for operating the nighttime front visual range detecting system has been turned on. This switch for operating the system can be manually pressed when the driver drives the vehicle while looking at the image of the head-up display 6. However, the switch may be turned on as soon as the headlamp starts emitting a low beam.

If the result in Step S1 is YES (the switch for operating the nighttime front visual range detecting system has been turned on), it is judged in Step S2, based on an output from the vehicle speed sensor 110, whether or not the vehicle speed V is equal to or lower than the predetermined speed V0 that is close to 0. If the result in Step S2 is NO (V>V0), the operation proceeds to Step 3 where a signal is outputted to light the infrared/visible-ray radiating bulb 20A (the infrared-ray radiating lamp 10). The operation then returns to Step S1. On the other hand, if the result in Step S1 is NO (the switch for operating the nighttime front range detecting system has not been turned on), or if the result in Step S2 is YES (V≦V0), a signal is outputted to extinguish the infrared/visible-ray radiating bulb 20A (the infrared-ray radiating lamp 10) in Step S4. The operation then returns to Step S1.

In the infrared-ray transmitting multilayer film 24 of the aforementioned embodiment, the visible-ray transmitting portions 26 are evenly distributed according to a dot pattern. However, annular infrared-ray transmitting portions (visible-ray transmitting portions) may be disposed continuously at an equal axial pitch, namely, according to a lateral stripe pattern, or axially extending rectilinear infrared-ray transmitting portions (visible-ray transmitting portions) may be disposed continuously at an equal circumferential pitch, namely, according to a longitudinal stripe pattern.

Figure 6:
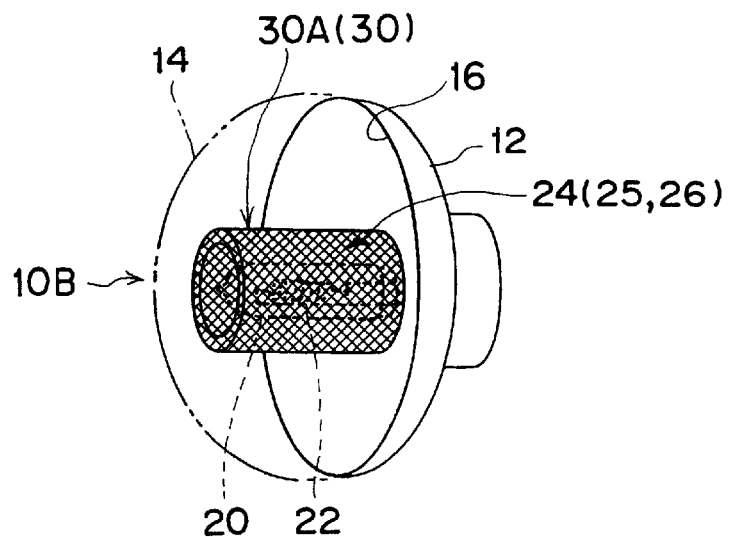
FIG. 6 is a perspective view of an infrared-ray radiating lamp according to a second embodiment of the invention.

FIG. 6 is a perspective view of an infrared-ray radiating lamp according to a second embodiment of the invention.

In the infrared-ray radiating lamp 11B according to the second embodiment of the invention, an infrared-ray transmitting globe 30A is disposed around an incandescent bulb 20 fitted into the bulb fitting hole in the lamp body 12 (the reflector 16).

The infrared-ray transmitting globe 30A has a construction wherein an infrared-ray transmitting multilayer film 24 as in the first embodiment (the infrared-ray transmitting multilayer film having the visible-ray transmitting portions 26 designed as circular holes evenly distributed according to a dot pattern) is disposed over the entire outer peripheral face of a cylindrical globe body 30 made of transparent glass.

Thus, of the rays emitted by the incandescent bulb 20, infrared rays are transmitted by the infrared-ray transmitting multilayer film 24 (the infrared-ray transmitting portions 25), reflected by the reflector 16 and distributed forwards, and visible rays are transmitted by the visible-ray transmitting portions 26, reflected by the reflector 16 and distributed forwards. Both infrared rays and visible rays are emanated simultaneously from the infrared-ray radiating lamp 10B (the front lens 14). Thus, the rays distributed by the lamp 10B include both infrared rays and visible rays, and therefore the red color is not particularly noticeable.

In the infrared-ray transmitting multilayer film 24 of the second embodiment, the visible-ray transmitting portions 26 are evenly distributed according to a dot pattern. However, annular infrared-ray transmitting portions (visible-ray transmitting portions) may be disposed continuously at an equal axial pitch, namely, according to a lateral stripe pattern, or axially extending rectilinear infrared-ray transmitting portions (visible-ray transmitting portions) may be disposed continuously at an equal circumferential pitch, namely, according to a longitudinal stripe pattern.

Figure 7:
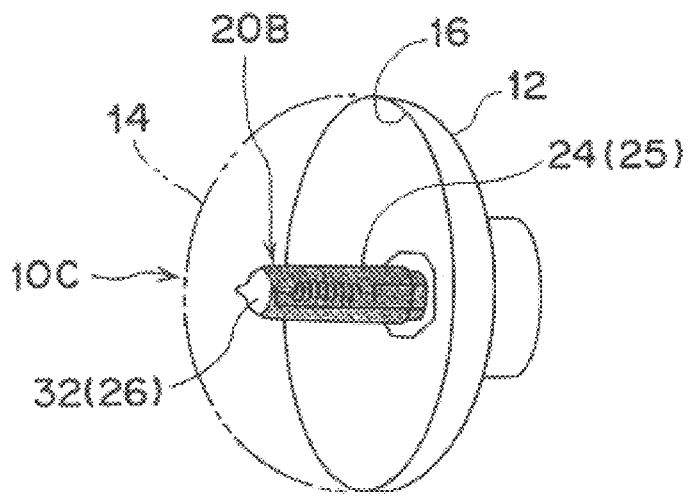
FIG. 7 is a perspective view of an infrared-ray radiating lamp according to a third embodiment of the invention.

FIG. 7 is a perspective view of an infrared-ray radiating lamp according to a third embodiment of the invention.

In an infrared-ray radiating lamp 10C according to the third embodiment of the invention, the infrared/visible-ray radiating bulb 20B is different in construction from the bulb 20A of the first embodiment. That is, an infrared-ray transmitting multilayer film 24 composed only of infrared-ray transmitting portions 25 is disposed over the entire outer peripheral face of the glass bulb 21 except its tip region in which the filament 22 is located.

Of the rays emitted by the filament 22, infrared rays are transmitted by the infrared-ray transmitting portions 25 (the infrared-ray transmitting multilayer film 24), and is visible rays are transmitted by the visible-ray transmitting portions 26, namely, an infrared-ray transmitting multilayer film-free region 32 at the tip of the glass bulb 21. Both infrared rays and visible rays are emanated from the infrared-ray radiating lamp 10C (the front lens 14). Thus, the rays distributed by the lamp 10C include both infrared rays and visible rays, and therefore the red color is not particularly noticeable.

At the tip of the glass bulb 21 of the infrared/visible-ray radiating bulb 20B in the infrared-ray radiating lamp 10C of the third embodiment, the visible-ray transmitting portions 26 are disposed as the infrared-ray transmitting multilayer film-free region 32. However, a blue-ray transmitting multilayer film may be disposed in the infrared-ray transmitting multilayer film-free region 32 at the tip of the glass bulb so that blue rays are radiated from the tip of the glass bulb.

In such a construction, the filament 22 in the glass bulb 21 and the infrared-ray transmitting multilayer film 24 (the infrared-ray transmitting portions 25) constitute infrared-ray radiation means, and the filament 22 and the blue-ray transmitting multilayer film constitute visible-ray radiation means. Because blue is close to the complementary color of red, the blue rays directly radiated forwards by the tip of the glass bulb (the blue-ray transmitting multilayer film) effectively counteract the redness of the infrared rays reflected by the reflector 16. As a result, the rays distributed by the lamp 10C have a color rather close to the color of white light.

Figure 8:
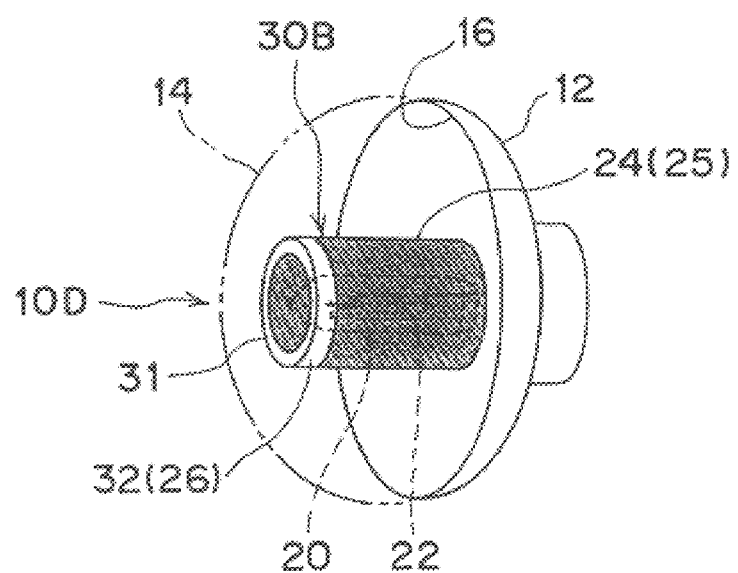
FIG. 8 is a perspective view of an infrared-ray radiating lamp according to a fourth embodiment of the invention.

FIG. 8 is a perspective view of an infrared-ray radiating lamp according to a fourth embodiment of the invention.

In an infrared-ray radiating lamp 10D according to the fourth embodiment of the invention, an infrared-ray transmitting globe 30B is disposed around the incandescent bulb 20. The infrared-ray transmitting globe 30B has a construction wherein the infrared-ray transmitting multilayer film 24 designed as the infrared-ray transmitting portions 25 is disposed over the entire outer peripheral face of the cylindrical globe body 30 made of transparent glass except the annular region 32 at the tip of the globe body 30.

Of the rays emitted by the incandescent bulb 20, infrared rays are transmitted by the infrared-ray transmitting portions 25 (the infrared-ray transmitting multilayer film 24), reflected by the reflector 16 and distributed forwards, and visible rays are transmitted by the visible-ray transmitting portions 26 in the infrared-ray transmitting multilayer film-free region 32 at the tip of the globe or pass through an opening 31 at the tip of the globe and are directly distributed forwards. Both infrared rays and visible rays are emanated from the infrared-ray radiating lamp 10D (the front lens 14) simultaneously. Thus, the rays distributed by the lamp 10D include both infrared rays and visible rays, and therefore the red color is not particularly noticeable.

In such a construction, the incandescent bulb 20 and the infrared-ray transmitting multilayer film 24 (the infrared-ray transmitting portions 25) constitute infrared-ray radiation means, and the incandescent bulb 20, the infrared-ray transmitting multilayer film-free region 32 (the visible-ray transmitting portions 26) and the front opening 31 in the globe constitute visible-ray radiation means.

At the tip of the globe of the fourth embodiment, the visible-ray transmitting portions 26 are disposed as the infrared-ray transmitting multilayer film-free region 32. However, a blue-ray transmitting multilayer film may be disposed in the infrared-ray transmitting multilayer film-free region 32 at the tip of the globe so that blue rays are radiated from the tip of the glass bulb.

In such a construction, the incandescent bulb 20, the blue-ray transmitting multilayer film and the opening 31 at the tip of the globe constitute visible-ray radiation means.

Because blue is close to the complementary color of red, the blue rays directly radiated forwards by the tip of the glass bulb (the blue-ray transmitting multilayer film) effectively counteract the redness of the infrared rays reflected by the reflector 16 and radiated forwards. As a result, the rays distributed by the lamp 10D assume a color rather close to the color of white light.

Figure 9:
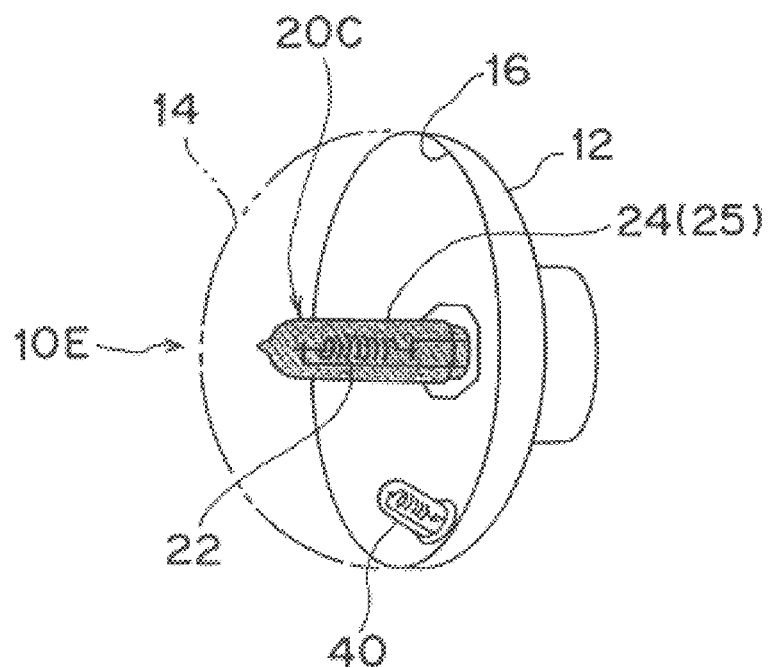
FIG. 9 is a perspective view of an infrared-ray radiating lamp according to a fifth embodiment of the invention.

FIG. 9 is a perspective view of an infrared-ray radiating lamp according to a fifth embodiment of the invention.

In the infrared-ray radiating lamp 10E according to the fifth embodiment of the invention, the infrared-ray transmitting multilayer film 24 is disposed over the entire outer peripheral face of the glass bulb 21 having the filament 22 as its light source to constitute the infrared/visible-ray radiating bulb 20C. An incandescent bulb 40 designed as an auxiliary bulb functioning as a clearance bulb is disposed below the bulb 20C.

That is, infrared-ray radiation means is composed of the filament 22 and the infrared-ray transmitting multilayer film 24 disposed on the outer surface of the glass bulb 21 to cover the filament 22, and visible-ray radiation means is composed of the incandescent bulb 40 disposed in combination with the bulb 20C.

Of the rays emitted by the filament 22, only infrared rays are transmitted by the infrared-ray transmitting portions 25 constructed of the infrared-ray transmitting multilayer film 24, reflected by the reflector 16, emanated from the front lens 14 and distributed in a predetermined forward direction. On the other hand, the rays radiated from the incandescent bulb 40 (visible rays) are also reflected by the reflector 16, emanated from the front lens 14 and distributed in a predetermined forward direction. Thus, the rays distributed by the infrared-ray radiating lamp 10E include both infrared rays and visible rays, and therefore the red color is not particularly noticeable.

Instead of employing the incandescent bulb 40, it is possible to employ a blue-ray radiating bulb wherein a glass bulb is made of a blue-ray transmitting glass or wherein a blue-ray transmitting multilayer film is disposed over the entire surface of a glass bulb so as to ensure that only blue rays are radiated from the glass bulb. In such a construction, the rays distributed by the lamp assume a color closer to the color of white light in comparison with the case where the incandescent bulb 40 is employed.

Figure 10:
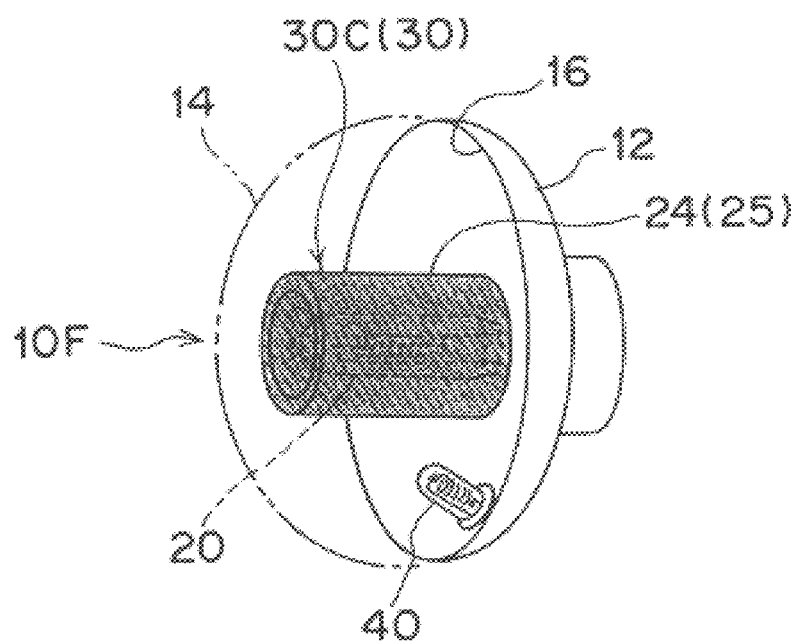
FIG. 10 is a perspective view of an infrared-ray radiating lamp according to a sixth embodiment of the invention.

FIG. 10 is a perspective view of an infrared-ray radiating lamp according to a sixth embodiment of the invention.

In the infrared-ray radiating lamp 10F according to the sixth embodiment of the invention, an incandescent bulb 20 is provided instead of the infrared/visible-ray radiating bulb 20C, and the infrared-ray transmitting globe 30C is disposed around the incandescent bulb 20. The globe 30C has a construction wherein the infrared-ray transmitting multilayer film 24 is disposed over the entire outer peripheral face of the cylindrical globe body 30 made of transparent glass so that the infrared rays that have been transmitted by the globe 30 (the infrared-ray transmitting multilayer film 24) travel towards the reflector 16.

Because the sixth embodiment is identical to the fifth embodiment (see FIG. 9) in other respects, like components are denoted by like reference numerals and repetition of the same description will be avoided.

Figure 11:
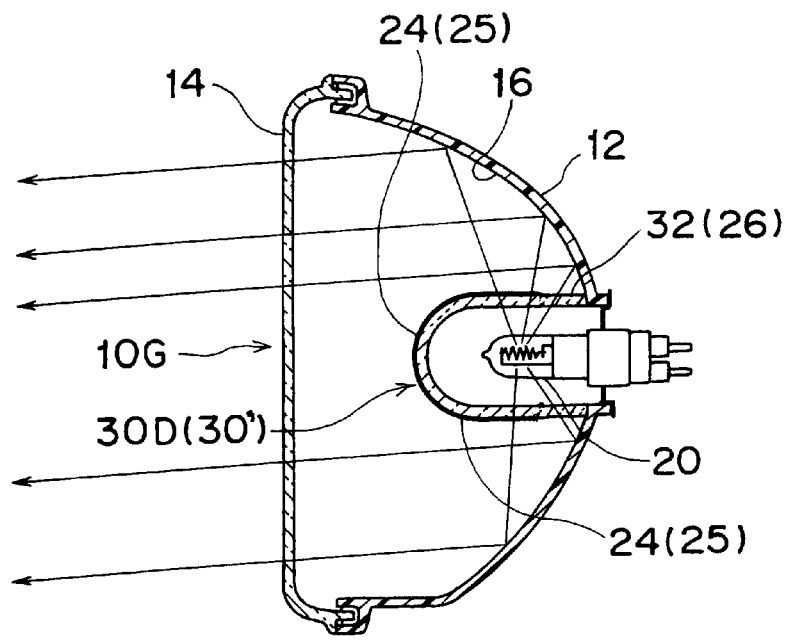
FIG. 11 is a cross-sectional view of an infrared-ray radiating lamp according to a seventh embodiment of the invention.

FIG. 11 is a cross-sectional view of an infrared-ray radiating lamp according to a seventh embodiment of the invention.

In the infrared-ray radiating lamp 10G according to the seventh embodiment of the invention, an infrared-ray transmitting globe 30D is disposed so as to cover the incandescent bulb 20. The infrared-ray transmitting globe 30D has a construction wherein the infrared-ray transmitting multilayer film 24 composed of the infrared-ray transmitting portions 25 is disposed over the entire outer peripheral face of a cap-shaped globe body 30' made of transparent glass except the annular region 32 on the side of a base end of the globe body 30'.

Of the rays emitted by the incandescent bulb 20, infrared rays are transmitted by the infrared-ray transmitting portions 25 (the infrared-ray transmitting multilayer film 24) of the globe 30D, reflected by the reflector 16 and distributed forwards. On the other hand, visible rays are transmitted by the visible-ray transmitting portions 26, namely, the infrared-ray transmitting multilayer film-free region 32 on the side of the base end of the globe, reflected by the reflector 16, and distributed forwards. Thus, both infrared rays and visible rays are emanated from the infrared-ray radiating lamp 10G (the front lens 14). As a result, the rays distributed by the lamp 10G include both infrared rays and visible rays, and therefore the red color is not particularly noticeable.

A blue-ray transmitting multilayer film may be disposed in the infrared-ray transmitting multilayer film-free region 32 (the visible-ray transmitting portions 26) so that the rays distributed by the infrared-ray radiating lamp assume a color rather close to the color of white light.

Figure 12:
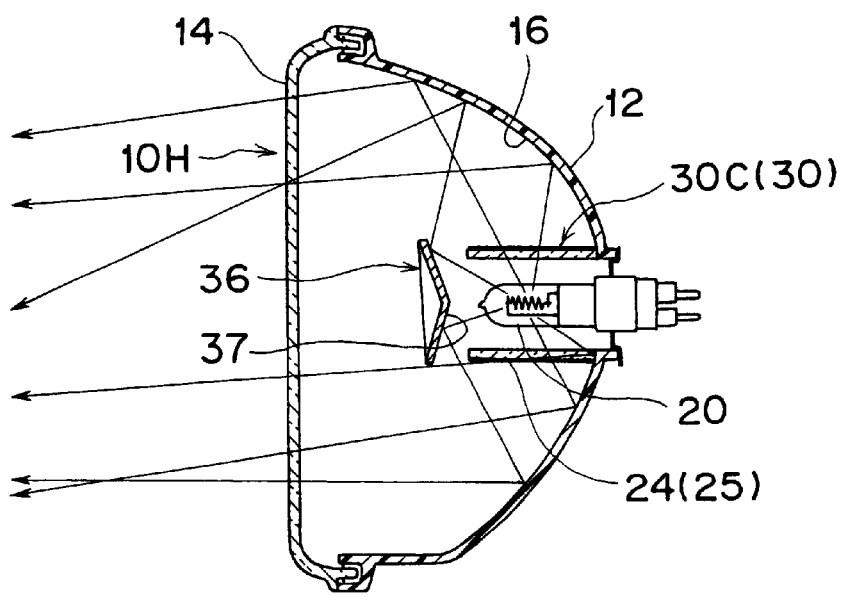
FIG. 12 is a cross-sectional view of an infrared-ray radiating lamp according to an eighth embodiment of the invention.

FIG. 12 is a cross-sectional view of an infrared-ray radiating lamp according to an eighth embodiment of the invention.

In the infrared-ray radiating lamp 10H according to the eighth embodiment of the invention, the infrared-ray transmitting globe 30C, which has a construction wherein the infrared-ray transmitting multilayer film 24 is disposed over is the entire outer peripheral face of the globe body 30, is disposed so as to cover the incandescent bulb 20. Of the rays emitted by the incandescent bulb 20, the infrared rays that have been transmitted by the globe 30C (the infrared-ray transmitting multilayer film 24) are reflected by the reflector 16 and distributed forwards.

A mirror 36, which is spaced apart from the tip of the globe 30C and has a convex reflecting surface 37 on the side of the bulb 20, is disposed in front of the incandescent bulb 20. The reflecting surface 37 of the mirror 36 is conical. The visible rays traveling forwards from the incandescent bulb 20 are reflected by the reflecting surface 37 and further by the reflector 16 and then distributed forwards. Thus, not only infrared rays but also visible rays are emanated from the infrared-ray radiating lamp 10H (the front lens 14) simultaneously. Thus, the rays distributed by the lamp 10H include both infrared rays and visible rays, and therefore the red color is not particularly noticeable.

A blue-ray transmitting multilayer film may be formed on the reflecting surface 37 of the mirror 36 so that blue rays are reflected by the reflecting surface 37 and that the rays distributed by the infrared-ray radiating lamp 10H assume a color rather close to the color of white light.

Figure 13:
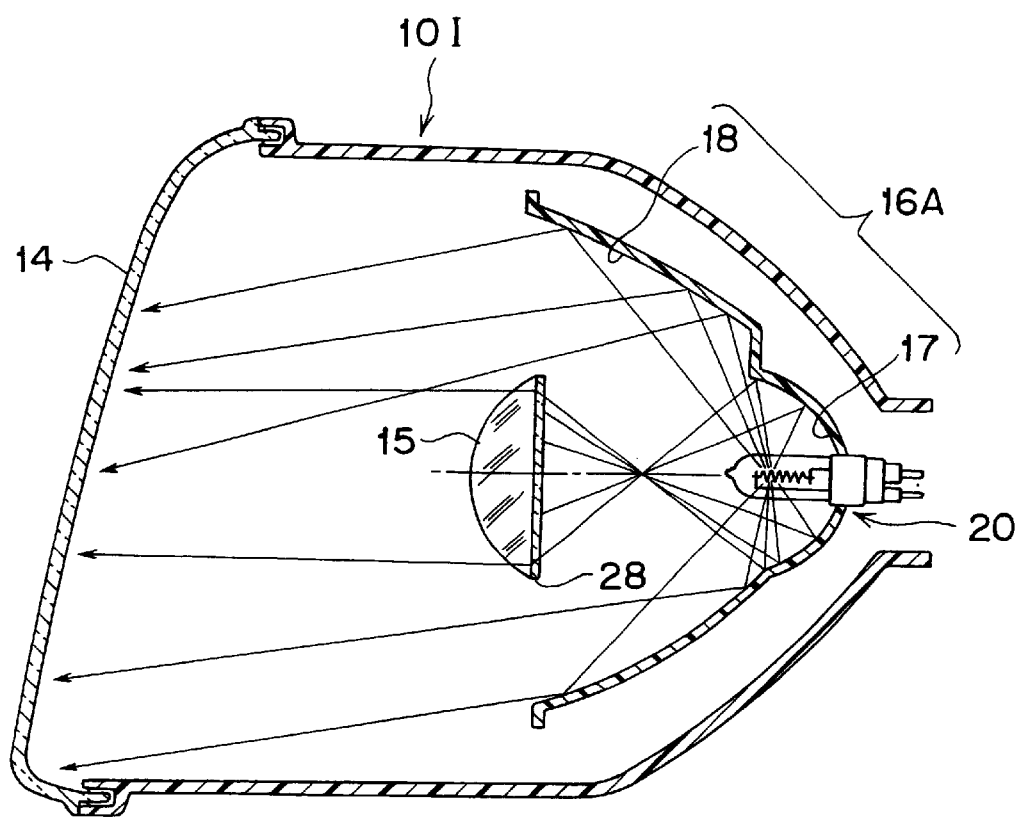
FIG. 13 is a cross-sectional view of an infrared-ray radiating lamp according to a ninth embodiment of the invention.

FIG. 13 is a cross-sectional view of an infrared-ray radiating lamp according to a ninth embodiment of the invention.

In the infrared-ray radiating lamp 10I according to the ninth embodiment of the invention, an integral-type reflector 16A is composed of an elliptical mirror 17 at the center and a parabolic mirror 18 on the outside, and an incandescent bulb 20 is disposed in the proximity of a first focus of the elliptical mirror 17.

Some of the rays emitted by the incandescent bulb 20 are reflected by the elliptical mirror 17, pass through a second focus, and are projected and distributed forwards by a projection lens 15 at the front. An infrared-ray transmitting filter 28 is disposed on the side of a plane of incidence of the projection lens 15. Only infrared rays impinge on the projection lens 15, and all the rays projected and distributed by the projection lens 15 are infrared rays. Some of the rays (visible rays) emitted by the incandescent bulb 20 are reflected by the parabolic mirror 18 and distributed forwards.

Thus, not only infrared rays but also visible rays are emanated from the infrared-ray radiating lamp 10I (the front lens 14) simultaneously. Thus, the rays distributed by the lamp 10I include both infrared rays and visible rays, and therefore the red color is not particularly noticeable.

Figure 14:
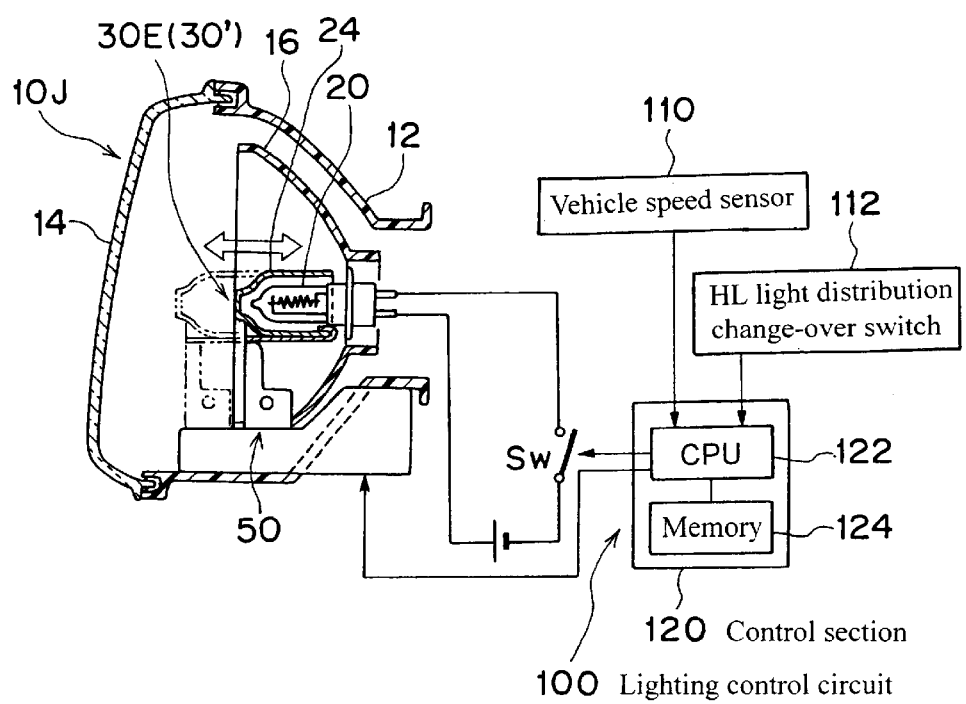
FIG. 14 is a cross-sectional view of an infrared-ray radiating lamp according to a tenth embodiment of the invention.

FIG. 14 is a cross-sectional view of an infrared-ray radiating lamp according to a tenth embodiment of the invention.

In the infrared-ray radiating lamp 10J according to the tenth embodiment of the invention, an infrared-ray transmitting globe 30E is disposed so as to cover the incandescent bulb 20, namely, a light source. The globe 30E has a construction wherein the infrared-ray transmitting multilayer film 24 (see FIG. 4) having the visible-ray transmitting portions 26 evenly distributed according to a dot pattern is disposed over the entire outer peripheral face of the cap-shaped globe body 30' made of transparent glass.

Of the rays emitted by the incandescent bulb 20, infrared rays are transmitted by the infrared-ray transmitting multilayer film 24 (the infrared-ray transmitting portion 25), and visible rays are transmitted by the visible-ray transmitting portions 26 designed as an infrared-ray transmitting multilayer film-free region. The infrared rays and the visible rays are reflected by the reflector 16 and distributed forwards. Thus, the rays distributed by the lamp 10J include both infrared rays and visible rays, and therefore the red color is not particularly noticeable.

The globe 30E is designed to be slid longitudinally along the optical axis by an actuator 50. In the case where the lamp 10J is used as an infrared-ray radiating lamp, since the bulb 20 is covered with the infrared-ray transmitting globe 30E as indicated by a solid line in FIG. 14, the rays distributed by the lamp 10J include both infrared rays and visible rays. On the other hand, in the case where the lamp 10J is used as a high-beam lamp of a four-bulb headlamp unit, the globe 30E is displaced forwards as indicated by a fictitious line in FIG. 14, whereby the periphery of the bulb 20 is released from the globe 30E. Thus, only visible rays are distributed by the lamp 10J.

That is, in the case where the lamp 10J is used as an infrared-ray radiating lamp, the lamp 10J is controlled by the lighting control circuit 100 provided with the vehicle speed sensor 110 and the control section 120 including the CPU 122, the memory unit 124, etc., so that the lamp 10J is lit as long as the vehicle is moving and that the lamp 10J is automatically extinguished as soon as the vehicle speed V becomes equal to or lower than the predetermined speed V0 that is close to 0, for example, after the stopping of the vehicle. Moreover, in the case where the rays distributed by the headlamp are utilized as a high beam, the globe 30E is displaced forwards to bring about a state where only visible rays are distributed.

That is, a vehicle speed condition for outputting a stop signal for stopping the emission of rays from the bulb 20 is inputted and set in advance in the memory unit 124 of the control section 120. If it is judged from an output from the vehicle speed sensor 110 that the vehicle speed V has become equal to or lower than the predetermined speed V0 that is close to 0, the CPU 122 outputs a stop signal for turning the bulb lighting switch Sw off. Thereby the bulb lighting switch Sw is turned off, and as a result, the supply of electric current to the bulb 20 is stopped and the bulb 20 (the lamp 10J) is extinguished.

Figure 15:
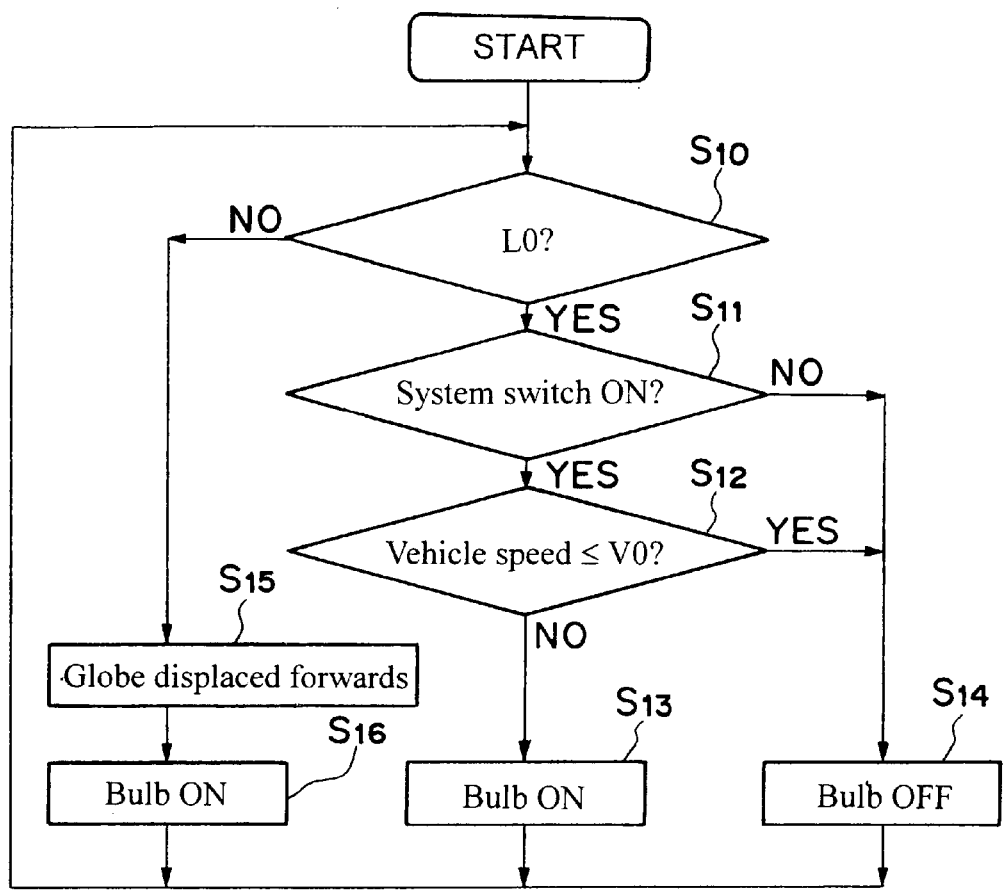
FIG. 15 is a flowchart showing processing operations carried out by a CPU in a control section for controlling the lighting of an infrared-ray radiating lamp.

FIG. 15 is a flowchart showing processing operations of the control section 120 (the CPU 122) in the lighting control circuit 100. This routine is started on the premise that the headlamp is lit (to emit a low beam or a high beam).

First, in Step S10, it is judged based on a signal from a light-distribution change-over switch 112 whether or not the headlamp is lit and emitting a low beam. If the result in Step S10 is YES (the headlamp is lit to emit a low beam), the operation proceeds to Step S11 where it is judged whether or not the switch for operating the nighttime front visual range detecting system has been turned on. This switch for operating the system is manually pressed when the driver is operating the vehicle while looking at the image of the head-up display 6. However, the switch may be turned on as soon as the headlamp starts emitting a low beam.

If the result in Step S11 is YES (the switch for operating the nighttime front visual range detecting system has been turned on), it is judged in Step S12, based on an output from the vehicle speed sensor 110, whether or not the vehicle speed V is equal to or lower than the predetermined speed (V0) that is close to 0. If the result in Step S12 is NO (V>V0), the operation proceeds to Step S13 where a signal is outputted to light up the bulb 20. The operation then returns to Step S10.

On the other hand, if the result in Step S10 is NO (the headlamp is emitting a high beam), the operation proceeds to Step S15 where an actuator drive signal is outputted to displace the globe 30E forwards. Then in Step S16, a signal is outputted to light the bulb 20. Thereby a high beam composed only of visible rays is obtained.

If the result in Step S11 is NO (the switch for operating the nighttime front visual range detecting system has not been turned on), or if the result in Step S12 is YES (V≦V0), a signal is outputted to extinguish the lit-up bulb 20 (the infrared-ray radiating lamp 10) in Step S14. The operation then returns to Step S10.

As is apparent from the foregoing description, when the infrared-ray radiating lamp is lit, the red color is not particularly noticeable, unlike the conventional case. Therefore, drivers of other vehicles and pedestrians do not mistake the infrared-ray radiating lamp for a tail lamp or a stop lamp, thus promoting safety while the vehicle is being operated.

When the vehicle speed is low or the vehicle is stopped, namely, in situations in which human eyes can be damaged by being continuously exposed to infrared rays, at least the radiation of infrared rays from the infrared-ray radiating lamp is automatically stopped. Therefore, the rays radiated by the lamp are prevented from causing damage to the eyes of pedestrians or drivers and passengers in oncoming vehicles.

A single infrared/visible-ray source can serve as both the light source of the infrared-ray radiation and the light source of the visible-ray radiation. Therefore, in comparison with the case where separate light sources are provided for the two types or radiation, it is possible to reduce the number of parts, simplify the structure, and make the lamp compact.

The infrared-ray radiating lamp can be constructed by employing an infrared/visible-ray radiating bulb having an infrared-ray transmitting film disposed on the outer surface of the glass bulb. Therefore, the lamp is structurally simple and compact.

Also, the infrared-ray radiating lamp can be constructed by employing a globe having an infrared-ray transmitting film on its outer surface so as to cover the bulb forming the light source. In this case too the lamp is structurally simple and compact.

Radiation of visible rays and radiation of infrared rays can be freely switched by displacing the globe longitudinally. Therefore, the lamp can be utilized as a lamp having two functions (radiating visible rays and infrared rays).

In another embodiment, an auxiliary bulb such as a clearance lamp can be utilized as the visible-ray radiation means, which makes it unnecessary to provide a separate visible-ray radiation means. Accordingly, the lamp is structurally simplified.

In yet another embodiment, an infrared-ray radiating lamp simultaneously achieving distribution of rays (infrared rays) by a projection-type lamp and distribution of rays (visible rays) by a reflection-type lamp is provided.

What is claimed is:

1. An infrared-ray radiating lamp for a motor vehicle comprising:
   a lighting chamber comprising a lamp body; a front lens; a reflector; and a light source emitting both infrared-ray radiation and visible-ray radiation, said light source is disposed in front of said reflector in said lighting chamber, and infrared rays and visible rays radiated from said light source emanate from said front lens simultaneously;
   wherein an infrared-ray transmitting film transmits said infrared rays and has at least one aperture which emits the visible ray radiation.

2. The infrared-ray radiating lamp according to claim 1, wherein said infrared-ray radiating lamp further comprises radiation control means for controlling radiation of infrared rays, wherein said radiation control means stops radiation of infrared rays when the speed of said vehicle is equal to or less than a predetermined speed.

3. The infrared-ray radiating lamp according to claim 1, wherein said light source comprises a glass bulb, and wherein said infrared-ray transmitting film is disposed on an outer surface of said glass bulb.

4. The infrared-ray radiating lamp according to claim 1, wherein said light source comprises a bulb and a globe surrounding said bulb, and wherein said infrared-ray transmitting film is disposed on an outer surface of said globe.

5. The infrared-ray radiating lamp according to claim 4, wherein said globe is longitudinally displaceable between a rearward position on an optical path of rays from said light source towards said reflector and a forward position in front of said light source.

6. The infrared-ray radiating lamp according to claim 1, wherein said at least one aperture comprises a plurality of evenly distributed holes formed in a said film.

7. The infrared-ray radiating lamp according to claim 1, further comprising a blue-ray transmitting multilayer film disposed over said at least one aperture.

8. An infrared-ray radiating lamp for a motor vehicle comprising: a lighting chamber comprising a lamp body and a front lens; a reflector disposed in said lighting chamber; infrared-ray radiation means and visible-ray radiation means disposed in front of said reflector in said lighting chamber, infrared rays radiated from said infrared-ray radiation means and visible rays radiated from said visible-ray radiation means emanating from said front lens simultaneously;

wherein said infrared-ray radiation means comprises an infrared/visible-ray source and an infrared-ray transmitting film covering said infrared/visible-ray source, and wherein said visible-ray radiation means comprises an auxiliary bulb disposed in front of said reflector in said lighting chamber.

9. An infrared-ray radiating lamp for a motor vehicle comprising:

a lighting chamber comprising a lamp body; a front lens; a reflector; and a light source emitting both infrared-ray radiation and visible-ray radiation, said light source is disposed in front of said reflector in said lighting chamber, and infrared rays and visible rays radiated from said light source emanate from said front lens simultaneously;

wherein said reflector comprises an elliptical mirror at a center portion of said reflector and a parabolic mirror disposed outside said elliptical mirror; said light source is disposed in the proximity of a first focus of said elliptical mirror, a projection lens is disposed in front of said light source, and an infrared-ray transmitting filter is disposed between said light source and said projection lens;

said infrared rays are produced by the successive reflection from said elliptical mirror and transmission through said infra-red ray transmitting filter and said projection lens, and said visible rays are produced by reflection from said parabolic mirror.

10. In an infrared imaging system for a motor vehicle having a lamp for irradiating a region in front of the vehicle with radiation including infrared radiation, a least one imaging camera for sensing radiation returned from said region, and a display for displaying information derived from said at least one imaging camera, the improvement wherein:

said lamp comprises a light source simultaneously emitting infrared and visible light onto said region via an infrared-ray transmitting film that transmits said infrared light and has at least one aperture which emits said visible light, wherein said infrared light is of an intensity sufficient to operate said imaging camera, and said visible light is of a color and intensity sufficient to substantially mask a visible red component accompanying said infrared light.

11. The infrared imaging system according to claim 10, wherein said light source comprises a bulbs and said infrared-ray transmitting film partially covers said bulb.

12. The infrared imaging system according to claim 11, further comprising a blue-ray transmitting film covering at least a portion of areas of said bulb not covered by said infrared-ray transmitting film.

13. The infrared imaging system according to claim 10, wherein said light source comprises a bulb and globe surrounding said bulb, and said infrared-ray transmitting film partially covers said globe.

14. The infrared imaging system according to claim 13, further comprising a blue-ray transmitting film covering at least a portion of areas of said bulb not covered by said infrared-ray transmitting film.

15. The infrared imaging system according to claim 10, further comprising a control circuit including a speed sensor and a processor for stopping radiation of infrared rays by said lamp when the speed of said vehicle is equal to or less than a predetermined speed.

16. In an infrared imaging system for a motor vehicle having a lamp for irradiating a region in front of the vehicle with radiation including infrared radiation, a least one imaging camera for sensing radiation returned from said region, and a display for displaying information derived from said at least one imaging camera, the improvement wherein said lamp comprises light source simultaneously emitting infrared and visible light onto said region, said infrared light being of an intensity sufficient to operate said imaging camera, and said visible light being of a color and intensity sufficient to substantially mask a visible red component accompanying said infrared light wherein said lamp comprises a reflector comprising an elliptical mirror at a center portion of said reflector and a parabolic mirror disposed outside said elliptical mirror, an infrared/visible-ray source disposed in the proximity of a first focus of said elliptical mirror, a projection lens disposed in front of said infrared/visible-ray source, and an infrared-ray transmitting filter disposed between said infrared/visible-ray source and said projection lens.

17. An infrared-ray radiating lamp for a motor vehicle comprising: a lighting chamber comprising a lamp body and a front lens; a reflector disposed in said lighting chamber; infrared-ray radiation means and visible-ray radiation means disposed in front of said reflector in said lighting chamber, infrared rays radiated from said infrared-ray radiation means and visible rays radiated from said visible-ray radiation means emanating from said front lens simultaneously:

wherein said infrared-ray radiating lamp further comprises radiation control means for controlling radiation of infrared rays by at least said infrared-ray radiation means, wherein said radiation control means stops radiation of infrared rays by said infrared-ray radiation means when the speed of said vehicle is equal to or less than a predetermined speed.

18. In an infrared imaging system for a motor vehicle having a lamp for irradiating a region in front of the vehicle with radiation including infrared radiation, a least one imaging camera for sensing radiation returned from said region, and a display for displaying information derived from said at least one imaging camera, the improvement wherein said lamp comprises light source simultaneously emitting infrared and visible light onto said region, said infrared light being of an intensity sufficient to operate said imaging camera, and said visible light being of a color and intensity sufficient to substantially mask a visible red component accompanying said infrared light wherein said light source comprises an infrared/visible-ray source and an infrared-ray transmitting film covering said infrared/visible-ray source, and an auxiliary bulb emitting visible light.

19. In an infrared imaging system for a motor vehicle having a lamp for irradiating a region in front of the vehicle with radiation including infrared radiation, a least one imaging camera for sensing radiation returned from said region, and a display for displaying information derived from said at least one imaging camera, the improvement wherein said lamp comprises light source simultaneously emitting infrared and visible light onto said region, said infrared light being of an intensity sufficient to operate said imaging camera, and said visible light being of a color and intensity sufficient to substantially mask a visible red component accompanying said infrared light further comprising a control circuit including a speed sensor and a processor for stopping radiation of infrared rays by said lamp when the speed of said vehicle is equal to or less than a predetermined speed.

* * * * *